United States Patent
Buehring

(10) Patent No.: US 6,678,179 B2
(45) Date of Patent: Jan. 13, 2004

(54) CIRCUIT ARRANGEMENT FOR GAINING A DIRECT VOLTAGE USING FULL BRIDGE RECTIFIER AND COUPLING CAPACITORS

(75) Inventor: Peter Buehring, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/107,010

(22) Filed: Mar. 26, 2002

(65) Prior Publication Data

US 2003/0016547 A1 Jan. 23, 2003

(30) Foreign Application Priority Data

Mar. 31, 2001 (DE) .......................... 101 16 156

(51) Int. Cl.[7] .............................................. H02M 7/00
(52) U.S. Cl. ........................................ 363/125; 363/69
(58) Field of Search .......................... 363/125, 65, 67, 363/68, 69, 70, 126

(56) References Cited

U.S. PATENT DOCUMENTS 4,660,136 A * 4/1987 Montorefano ................ 363/26
6,014,322 A * 1/2000 Higashi et al. ................ 363/65
6,483,731 B1 * 11/2002 Isurin et al. .................. 363/125

FOREIGN PATENT DOCUMENTS

| EP | 0858174 A2 | 2/1998 | ............ H04B/3/54 |
| EP | 1081837 A1 | 8/1999 | .......... H02M/3/137 |

OTHER PUBLICATIONS

Patent Abstracts of Japan, vol. 2000, No. 06, Sep. 22, 2000, JP2000092855.
Patent Abstracts of Japan, vol. 2000, No. 06, Sep. 22, 2000, JP07031148.

* cited by examiner

Primary Examiner—Adolf D. Berhane
(74) Attorney, Agent, or Firm—Aaron Waxler

(57) ABSTRACT

In the circuit arrangement according to the invention, means (1) for generating an alternating voltage from the DC input voltage are provided for gaining an offset-compensated DC output voltage from a DC input voltage, without using transformers and inductances. The alternating voltage is applied to at least one rectifier stage (2) which comprises two coupling capacitors (8, 9) and a subsequent full-bridge rectifier (10, 11, 12, 13) at its input, and is coupled at its output to an output capacitance (3) via which the DC output voltage decreases.

13 Claims, 2 Drawing Sheets

Figure 1:
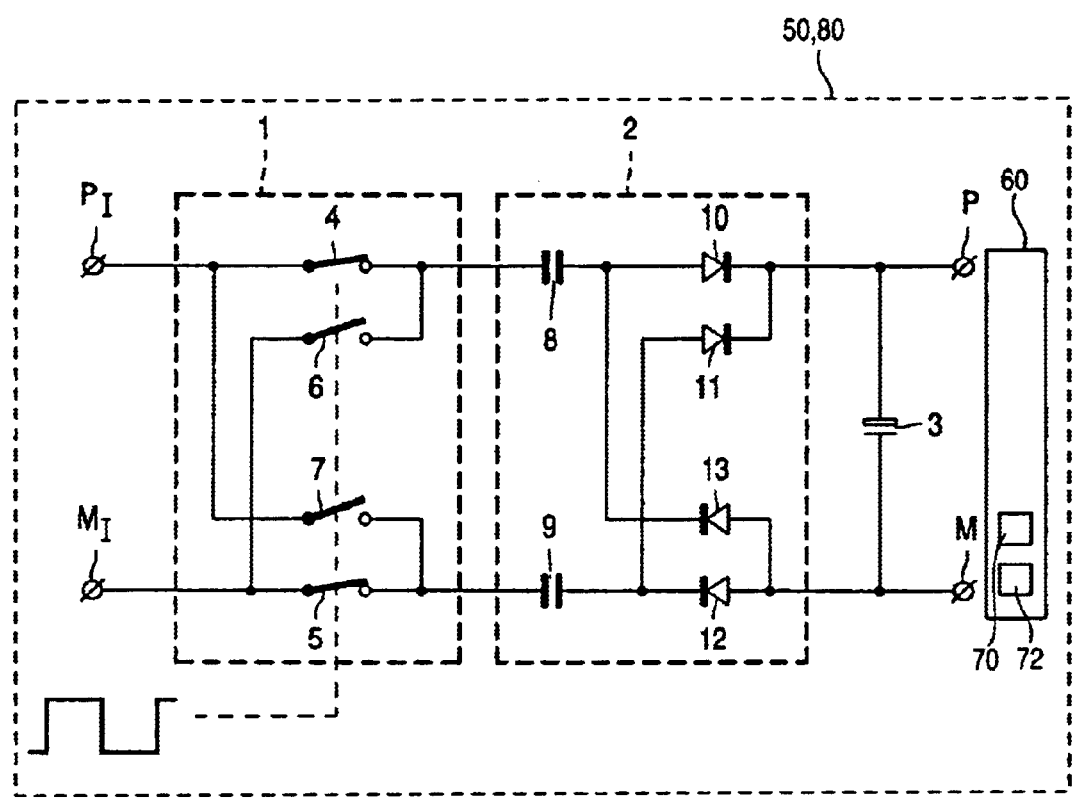

CIRCUIT ARRANGEMENT FOR GAINING A DIRECT VOLTAGE USING FULL BRIDGE RECTIFIER AND COUPLING CAPACITORS

The invention relates to a circuit arrangement for gaining a DC output voltage from a DC input voltage. The DC output voltage should be offset-compensated, i.e. in the case where a DC output voltage terminal is coupled to another potential, the potential of the other DC output voltage terminal occurs in a corresponding offset-compensated form, i.e. taking the potential jump of the other terminal into account.

Such circuit arrangements are desirable, for example, for bus systems, particularly in vehicles. In bus systems in which the power supply of the bus participants takes place via the bus lines, a power supply for the participants should also be ensured when one of the bus lines is coupled to a fixed potential, for example, vehicle chassis.

A circuit concept is known from EP 0 858 174 A2 in which this problem is solved by means of a transformer. For many applications, particularly in vehicles, the use of transformers is, however, not very popular. Transformers are expensive and sensitive so that they may break, particularly in vehicles. Their high own weight is critical at fast accelerations as may occur, for example, in the case of accidents. It is exactly in these cases that a flawless functioning of the power supply is of particular importance.

It is an object of the invention to provide a circuit arrangement of the type described in the opening paragraph which can supply an offset-compensated DC output voltage and has a possibly simple structure without using transformers.

This object is solved by the following characteristic features defined in claim 1.

A circuit arrangement for gaining an offset-compensated DC output voltage from a DC input voltage, wherein means for generating an alternating voltage from the DC input voltage are provided, and wherein the alternating voltage is applied to at least one rectifier stage which comprises two coupling capacitors and a subsequent full-bridge rectifier at its input and is coupled at its output to at least an output capacitance via which the DC output voltage decreases.

In this concept, an alternating voltage is first gained from a DC input voltage. The alternating voltage is then applied to a rectifier stage which comprises two coupling capacitors at its input. The coupling capacitors precede a full-bridge rectifier which generates a direct voltage from the alternating voltage again. At its output, the circuit arrangement comprises an output capacitance to which the two terminals of the full-bridge rectifiers are coupled. Thus, a direct voltage decreases across the output capacitance, which, inter alia, has the advantage that, as regards its potential, it is separated from the potential of the DC input voltage, in any case for direct voltage and alternating voltages of lower frequencies.

When a short circuit occurs at one of the two terminals of the output capacitance, thus, for example, at one of the two lines of a subsequent bus system, the two coupling capacitors generate the required offset for the DC output voltage. When such a short circuit occurs, output currents initially flow in the capacitors until the DC component of the capacitor voltages has adjusted to the required offset.

In this way, an offset-compensated DC output voltage is obtained which is effective against short circuits of a terminal of the DC output voltage, against another direct voltage, or, dependent on the dimensioning of the coupling capacitors, also against a low-frequency alternating voltage.

A plurality of rectifier stages may be provided so that a DC output voltage which is larger than the DC input voltage can be generated.

The circuit arrangement according to the invention achieves the described objects without any transformer and by means of a relatively simple, purely electronic circuit. It is therefore relatively economical and particularly does not comprise heavy components which, when used in, for example vehicles, could break in the case of high accelerations.

The circuit arrangement may be specifically used in other applications for generating a positive, negative or positive and negative output voltage in that a desired potential is adjusted by a corresponding coupling of a terminal of the DC output voltage.

The circuit arrangement may be used, for example, also for battery-operated apparatuses in which a minimal number of cells should be used or in which given, also higher DC voltages should be generated with the desired polarity in the apparatus.

An embodiment of the invention as defined in claim 2 has the object to provide a DC output voltage which is higher as compared with the DC input voltage. A plurality of rectifier stages with two coupling capacitors each is provided, to which the alternating voltage is applied. The outputs of the rectifier stages are serially arranged one behind the other for the purpose of voltage multiplication. At least one output capacitance is arranged via the series arrangement of the outputs of the rectifier stages so that the sum of the direct voltages of the individual rectifier stages decreases at the output capacitance and is available as a DC output voltage.

As defined in claim 3, it is also possible to provide one output capacitance for each rectifier stage. The output voltage of the circuit arrangement then decreases across the series arrangement of the output capacitances.

In accordance with a further embodiment of the invention as defined in claim 5, a H bridge is advantageously provided for generating the alternating voltage, which H bridge generates an alternating voltage from the DC input voltage by using simple electronic switches and a corresponding switching voltage.

As defined in claim 6, the circuit arrangement according to the invention can be advantageously used for generating a DC power supply voltage for a data bus. The advantages described above particularly apply to the use in a vehicle, as defined in claim 7. Low costs, high reliability and disturbance security, also in the case of accidents, are important aspects. When the circuit arrangement according to the invention is used in a data bus in such a vehicle, a power supply of the bus participants via the data bus can also be ensured when one of the two bus lines, which may be simultaneously power supply lines, is coupled to a potential, for example, vehicle chassis.

As defined in claim 8, the circuit arrangement according to the invention is, however, also suitable for generating desired direct voltages in a relatively simple way in battery-operated apparatuses without the battery having to supply these voltages as regards quantity and sign.

These and other aspects of the invention are apparent from and will be elucidated with reference to the embodiments described hereinafter.

Figure 2:
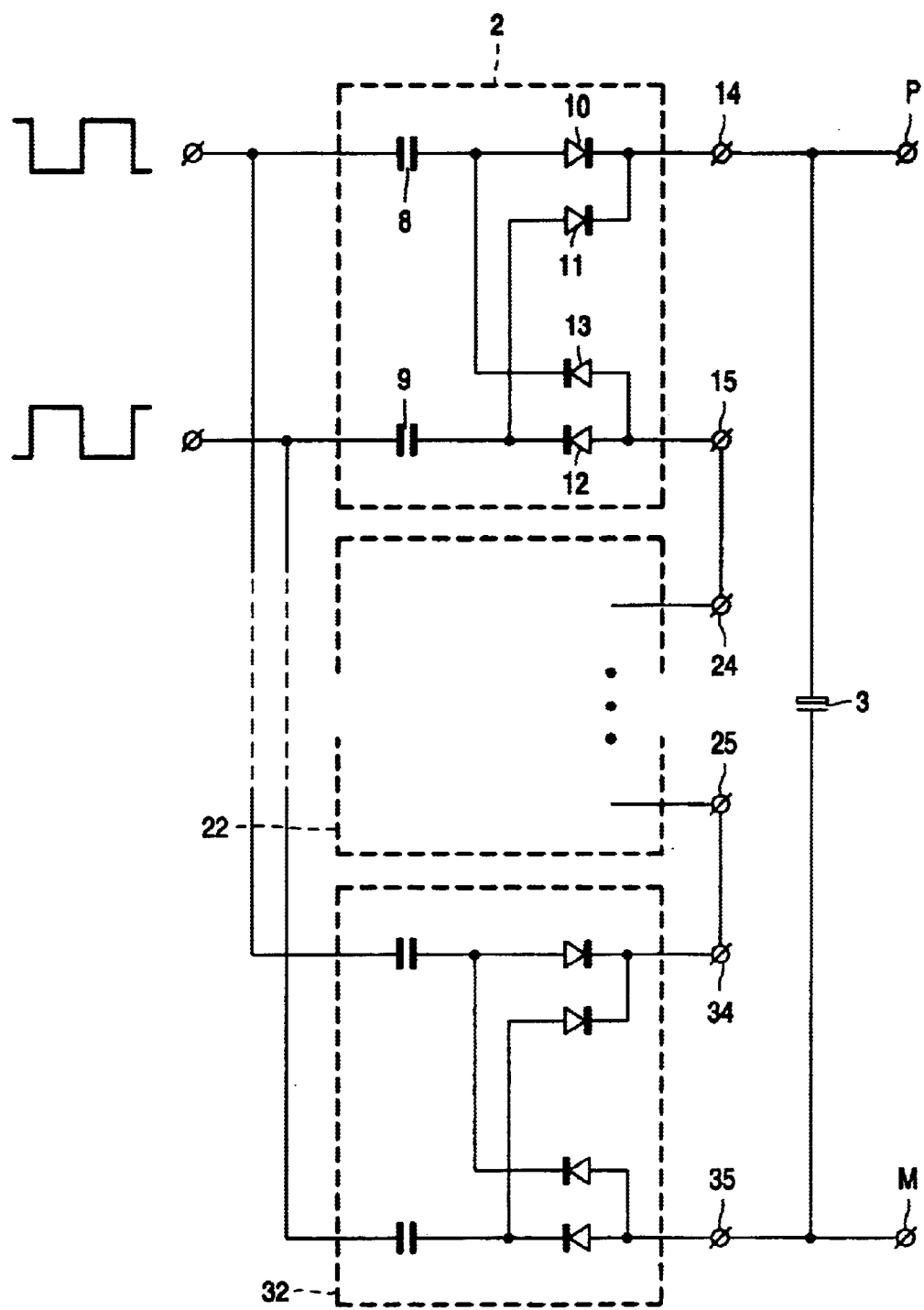

In the drawings:

FIG. 1 is a circuit diagram of a circuit arrangement according to the invention, comprising a rectifier stage, and FIG. 2 is a further embodiment of the circuit arrangement of FIG. 1, comprising a plurality of rectifier stages.

A circuit arrangement, shown in a diagram in FIG. 1, for generating a DC output voltage from a DC input voltage comprises, at its input, means 1 for generating an alternating voltage. The means 1 precede a rectifier stage 2 whose two output terminals are coupled to at least one output capacitance 3. The output capacitance 3 supplies the DC output voltage which is available at terminals P and M as shown in FIG. 1.

With reference to the example shown in FIG. 1, the simplest variant of the circuit arrangement according to the invention will now be elucidated, in which only one rectifier stage 2 is provided. Consequently, the circuit arrangement of FIG. 1 supplies a DC output voltage which, apart from component losses of the circuit arrangement, approximately corresponds to the DC input voltage.

This DC input voltage is applied at two terminals $P_I$ and $M_I$ to inputs of the means 1 for generating an alternating voltage. In the embodiment shown in FIG. 1, the means 1 for generating an alternating voltage are formed as a H bridge. The H bridge comprises first electronic switches 4 and 5 and second electronic switches 6 and 7. These electronic switches 4 to 7 are controlled by an alternating voltage which preferably has a square-wave variation. This is shown diagrammatically in the Figure.

When this alternating voltage for controlling the electronic switches 4 to 7 assumes a first potential, the first electronic switches 4 and 5 are closed and the second electronic switches 6 and 7 are open. When the alternating voltage for controlling the electronic switches assumes a second potential, the electronic switches 6 and 7 are closed and the electronic switches 4 and 5 are open.

In this way, the means 1 for generating an alternating voltage generates an alternating voltage at the output, which has a frequency corresponding to the alternating voltage for controlling the electronic switches 4 to 7.

This alternating voltage is applied to the rectifier stage 2. An alternating voltage terminal is coupled to a first coupling capacitor 8 and the other alternating voltage terminal is coupled to a second coupling capacitor 9.

Within the rectifier stage 2, the coupling capacitors 8 and 9 precede a full-bridge rectifier comprising diodes 10, 11, 12 and 13. These rectifier diodes 10 to 13 are arranged in the following way.

The anode of the diode 10 is coupled to the coupling capacitance 8 and the cathode is coupled to a first terminal of the output capacitance 3. The anode of the diode 11 is coupled to the coupling capacitance 9 and the cathode is also coupled to the first terminal of the output capacitance 3. The anode of the rectifier diode 12 is coupled to the second terminal of the output capacitance 3 and the cathode is coupled to the coupling capacitance 9. Finally, the anode of the rectifier diode 13 is coupled to the second terminal of the output capacitance 3 and the cathode is coupled to the first coupling capacitance 8.

Due to this arrangement of the rectifier diodes, a known full-bridge rectifier is realized which converts the AC input voltage into a direct voltage again. This direct voltage decreases across the output capacitance 3 and is available at the output terminals P and M of the circuit arrangement. This direct voltage is free from potential for direct voltages or for alternating voltages of a low frequency. When one of the terminals of the DC output voltage is short-circuited against a given potential, equalizing currents restoring the required offset for the DC output voltage flow through the coupling capacitors 8 and 9. When, for example, the terminal P of the output of the circuit arrangement according to the invention is short-circuited against a given DC potential, the equalizing currents through the coupling capacitors 8 and 9 ensure that the loads adjusting at the coupling capacitors 8 and 9 are such that the potential difference between the terminal P and the terminal M is again adjusted at the original value. In other words, the potential jump generated by the short circuit at the terminal P is also repeated as regards the terminal M so that the potential difference between the terminals P and M readjusts at the original value, in spite of the short circuit. Thus, this is an offset compensation.

In spite of these properties, the circuit arrangement according to the invention has the advantage that it can operate without transformers and inductances. As it requires a few electronic parts, it can be constructed in a relatively inexpensive way and is also suitable for use in vehicles in which the high acceleration values may occur.

For use in a vehicle FIG. 1), the output terminals P and M of the circuit arrangement according to the invention may be particularly coupled to a data bus system 60 of the vehicle and provided for supply to bus participants of this bus system. Also in the case of short-circuits of one of the lines of the bus system, a power supply for the bus participants is ensured by the offset compensation elucidated above. Likewise, the output terminals P and M may be provided for power supply of a data transmission device 70 and/or data receiving device 72 of a data bus system such as data bus system 60. In the case of short circuits of a line of the bus system in a corresponding design, the data exchange between the bus participants remains possible.

The circuit arrangement according to the invention may, however, also be used, for example, in battery-operated apparatuses 80 (FIG. 1) for generating direct voltages of different values or a different polarity than the battery voltage.

The latter particularly applies to the case where the circuit arrangement according to the invention comprises a plurality of rectifier stages 2.

Such an example will hereinafter be elucidated with reference to FIG. 2.

FIG. 2 is a circuit diagram of that part of a circuit arrangement according to the invention, which is preceded by the means 1 for generating an alternating voltage.

The input of the circuit arrangement of FIG. 2 receives a square-wave alternating voltage as generated in the circuit arrangement of FIG. 1 by the means 1 for generating an alternating voltage.

The circuit arrangement of FIG. 2 comprises a rectifier stage 2 which is identical to the rectifier stage 2 in the circuit arrangement of FIG. 1.

To generate a DC output voltage at the terminals P and M of the circuit arrangement of FIG. 2, which is higher than a DC input voltage of the circuit arrangement, which is not shown completely in FIG. 2, a plurality of rectifier stages 2 is provided. In addition to the rectifier stage 2 already mentioned, a further rectifier stage 22 as well as a third rectifier stage 32 are provided.

The rectifier stages 22 and 32 are identical to the rectifier stage 2. At the input, each rectifier stage comprises two coupling capacitors preceding a full-bridge rectifier stage comprising 4 rectifier diodes.

The AC input voltage is applied to the two coupling capacitances of each rectifier stage 2, 22 and 32. The inputs of each rectifier stage 2, 22 and 32 thus receive this alternating voltage.

However, as far as their outputs are concerned, the rectifier stages 2, 22 and 32 are arranged serially. This is achieved in that a first output 14 of the first rectifier stage 2 is coupled to a first terminal of the output capacitance 3. The other output terminal 15 of the rectifier stage 2, which supplies a potential which is lower at the first terminal 14, is coupled to a first output 24 of the second rectifier stage 22. A second output terminal 25 of the second rectifier stage 22, which supplies a potential which is lower than that at the first terminal 24, is coupled to a first output terminal 34 of the third rectifier stage 32. A second output terminal 35 of the third rectifier stage 32, which supplies a potential which is lower than that at the first output terminal 34, is coupled to a second terminal of the output capacitance 33.

Due to this arrangement, representing a consecutive arrangement of the rectifier stages 2, 22 and 32, an increase of the DC output voltage is achieved via the output capacitance 3 at the output terminals P and M of the circuit arrangement. In the embodiment of FIG. 2, approximately a triplication of the DC input voltage is achieved.

The number of rectifier stages may be selected in such a way that a desired DC output voltage is achieved.

It is also possible to provide an output capacitance for each rectifier stage 2, 22, 32 so that, in the embodiment shown in FIG. 2, one output capacitance is connected to the terminals 14 and 15, one is connected to the terminals 24 and 25 and one is connected to the terminals 34 and 35. The output voltage will then also be available at the terminals P and M, thus at the series arrangement of the output capacitances.

A desired sign of the DC output voltage may also be adjusted by coupling one of the output terminals P or M to a given potential. This is possible because of the described offset compensation of the circuit arrangement according to the invention. Dependent on the selection of the value of this potential, a positive and a negative voltage can be generated in this way, also relatively to this potential. The positive voltage is then available at the terminal P and the negative voltage is available at the terminal M. In the embodiment shown in FIG. 2, with three rectifier stages, a ground potential of 0 volt may be connected, for example, to the terminal 25. The circuit arrangement then generates a negative voltage at the terminal M and a positive voltage at the terminal P. Furthermore, a positive voltage which is half as large as that at the terminal P is available at the terminal 24.

The extension of the circuit arrangement according to the invention, shown in FIG. 2, may also be used for data bus systems in vehicles, for example, for generating a power supply voltage. In this case, it is possible to adjust a higher power supply voltage than the voltage which is supplied as a DC input voltage of the circuit arrangement by the battery of the vehicle.

Particularly the variant shown in FIG. 2 may be used advantageously for battery-operated apparatuses in which direct voltages of different values than those supplied by the battery are to be generated. By means of the circuit arrangement according to the invention, direct voltages of a different potential, i.e. of a different polarity may be generated in this way, and possibly even a plurality of direct voltages of different values and/or polarity.

What is claimed is:

1. A circuit arrangement for gaining an offset-compensated DC output voltage from a DC input voltage, wherein means (1) for generating an alternating voltage from the DC input voltage are provided, and wherein the alternating voltage is applied to at least one rectifier stage (2) which comprises two coupling capacitors (8, 9) and a subsequent full-bridge rectifier (10, 11, 12, 13) at its input, the two coupling capacitors being positioned between the generating means (1) and the subsequent full-bridge rectifier along paths from input terminals ($P_I, M_I$) to output terminals (P, M), and is coupled at its output to at least an output capacitance (3) via which the DC output voltage decreases.

2. A circuit arrangement as claimed in claim 1, characterized in that at least two rectifier stages (2, 22, 32) arranged parallel at the input side are provided, whose outputs are serially arranged one behind the other for the purpose of voltage multiplication, wherein at least one output capacitance (3) is arranged parallel to the series arrangement of the outputs of the rectifier stages (2, 22, 32).

3. A circuit arrangement as claimed in claim 1, characterized in that at least two rectifier stages (2, 22, 32) arranged parallel at the input side are provided, whose outputs are serially arranged one behind the other for the purpose of voltage multiplication, wherein a respective output capacitance is connected to the outputs of the rectifier stages (2, 22, 32), and the series arrangement of output capacitances supplies the DC output voltage.

4. A circuit arrangement as claimed in claim 1, characterized in that a respective alternating voltage terminal is connected to one of the coupling capacitors (8; 9) and in that the coupling capacitors (8; 9) are connected to the anode of a diode (10, 11) and to the cathode of a further diode (13; 12) of the full-bridge rectifier.

5. A circuit arrangement as claimed in claim 1, characterized in that an H bridge (4, 5, 6, 7) is provided as a means (1) for generating an alternating voltage.

6. Use of a circuit arrangement as claimed in claim 1, for generating a DC power supply voltage for a data bus.

7. Use of a circuit arrangement as claimed in claim 1, for generating a DC power supply voltage for a data bus in a vehicle.

8. Use of a circuit arrangement as claimed in claim 2, in a battery-operated apparatus, for generating a DC voltage which is higher as compared with the battery voltage.

9. Use of a circuit arrangement as claimed in claim 1, for generating a DC power supply voltage for data transmission devices and/or data receiving devices of a data bus system.

10. Use of a circuit arrangement as claimed in claim 1, for generating a DC power supply voltage for data transmission devices and/or data receiving devices of a data bus system in a vehicle.

11. A circuit arrangement for gaining an offset-compensated DC output voltage from a DC input voltage, comprising:
   means (1) for generating an alternating voltage from the DC input voltage;
   at least one rectifier stage (2) which comprises two coupling capacitors (8, 9) and a subsequent full-bridge rectifier (10, 11, 12, 13) at its input, and is coupled at its output to at least an output capacitance (3); and
   wherein the subsequent full bridge rectifier comprises two diodes (10, 11) including anodes coupled to the two coupling capacitors (8, 9) and cathodes coupled to a first terminal of the output capacitance (3), and two other rectifiers (12, 13) including cathodes coupled to the two coupling capacitors (8, 9) and anodes coupled to a second terminal of the output capacitance (3).

12. A circuit arrangement for gaining an offset-compensated DC output voltage from a DC input voltage, comprising:
   a transformerless means (1) for generating an alternating voltage from the DC input voltage; and
   at least one rectifier stage (2) which comprises two coupling capacitors (8, 9) and a subsequent full-bridge rectifier (10, 11, 12, 13) at its input, and is coupled at its output to at least an output capacitance (3) via which the DC output voltage decreases.

13. The circuit arrangement as claimed in claim 12, wherein the transformerless means (1) include an H bridge design of four switches (4, 5, 6, 7).

\* \* \* \* \*